H. L. DIXON & A. L. SCHRAM.
GLASS GATHERING FURNACE.
APPLICATION FILED MAR. 22, 1912.

1,035,866.

Patented Aug. 20, 1912.

2 SHEETS—SHEET 2.

WITNESSES

INVENTORS

UNITED STATES PATENT OFFICE.

HENRY L. DIXON, OF KNOXVILLE, PENNSYLVANIA, AND ALEXANDER L. SCHRAM, OF HILLSBORO, ILLINOIS.

GLASS-GATHERING FURNACE.

1,035,866.   Specification of Letters Patent.   Patented Aug. 20, 1912.

Application filed March 22, 1912. Serial No. 685,505.

*To all whom it may concern:*

Be it known that we, HENRY L. DIXON, a resident of Knoxville, in the county of Allegheny and State of Pennsylvania, and Alexander L. Schram, a resident of Hillsboro, in the county of Montgomery and State of Illinois, have invented a new and useful Improvement in Glass-Gathering Furnaces, of which the following is a full, clear, and exact description, reference being had to the accompanying drawings, forming part of this specification, in which—

Figure 1:
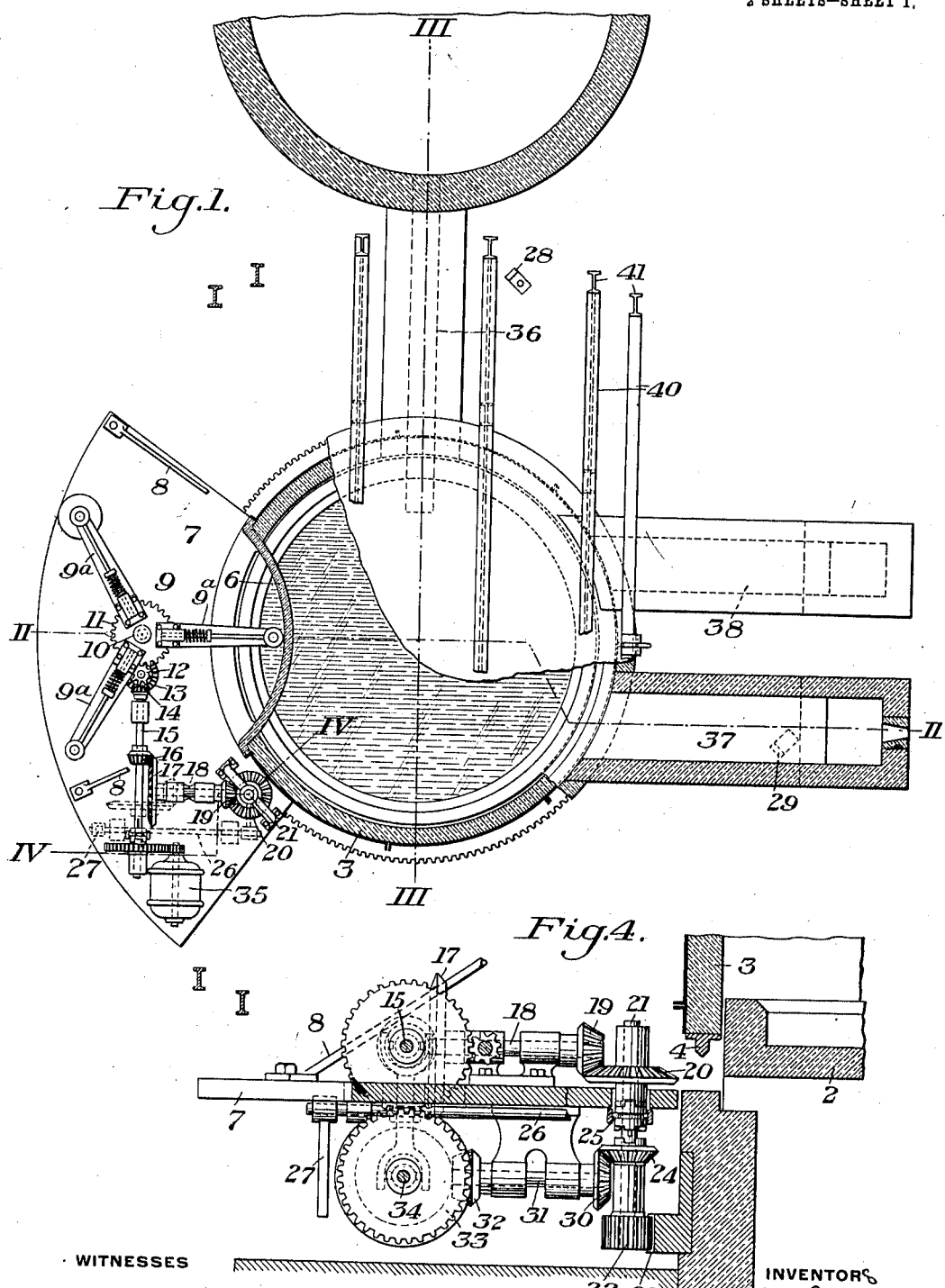
Figure 2:
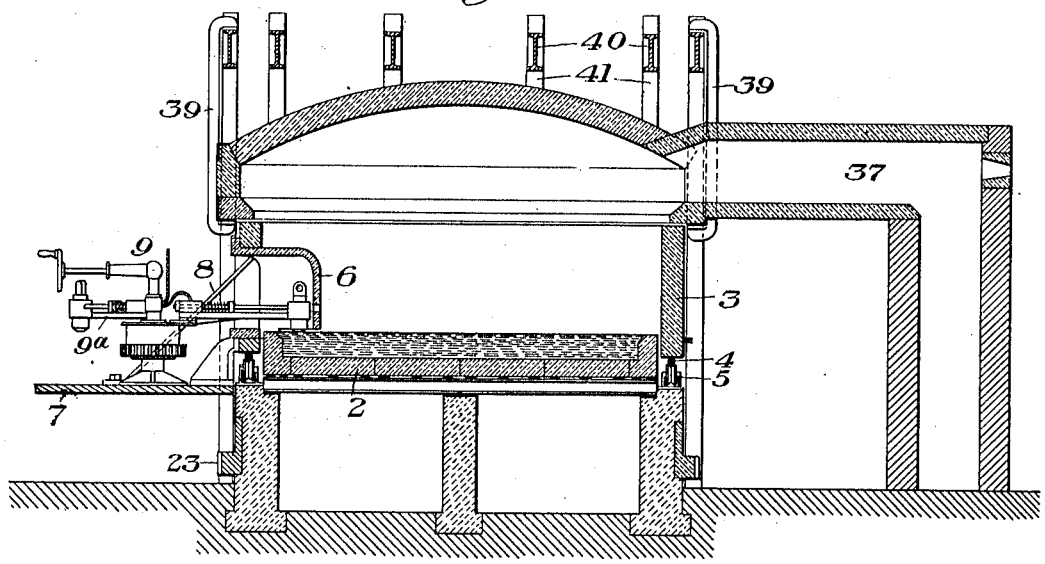
Figure 3:
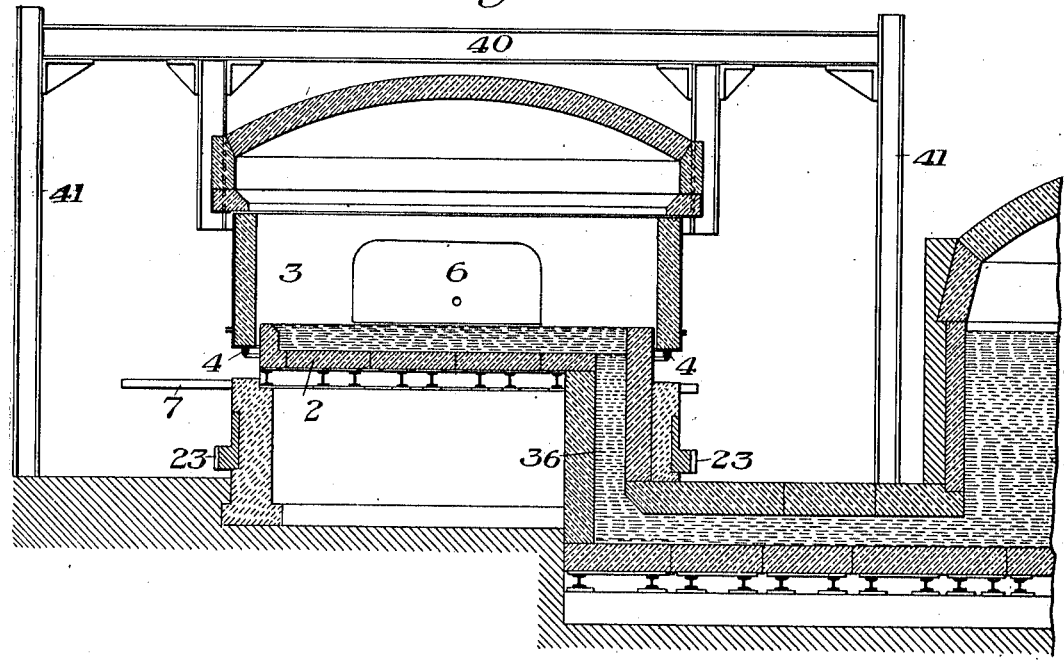

Figure 1 is a top plan view partly broken away, showing one form of our improved furnace; Figs. 2 and 3 are sections on the lines II—II and III—III, respectively, of Fig. 1; and Fig. 4 is a sectional detail view of the reversing driving mechanism and its connection, taken on the irregular line IV—IV of Fig. 1.

Our invention relates to the gathering of glass in a furnace, and is designed to provide an improved furnace for this purpose, which shall be simple, easily operated and effective.

In carrying out our invention, we preferably provide a stationary glass receptacle or tank which is surmounted by a revolving body, through which a heat supply circulates. This revolving furnace body or turret is provided with a suitable recess opening over the glass tank to give access to the gathering tool, and the body is surmounted by a relatively stationary roof, to which the inlet and outlet ports for the source of heat preferably extend. The furnace may, however, be varied quite widely within the scope of our appended claims.

In the drawings, 2 represents a stationary bottom tank portion of a gathering furnace of circular form, and 3 the annular furnace body or turret which is oscillated about the tank. This furnace body is of annular form and provided with a lower circular rail 4 resting on wheels 5, carried in suitable bearings on the foundation for the tank. This turret is provided at one side with an inwardly extending hood or recessed portion 6, giving access to the glass bath for a small portion thereof. Adjacent to this recess, the rotary body is provided with a projecting platform or support 7, which may be carried on diagonal tension members 8 or in any other desirable way. This platform is carried by and rotates with the turret and has the gathering machine mounted thereon, shown at 9. We have shown this gathering machine as having three arms 9ª, carried on a hub of the body 10, provided with toothed wheel 11. This toothed wheel is driven by a pinion 12 on a shaft carrying bevel gear 13, intermeshing with bevel pinion 14, on shaft 15. The shaft 15 is provided with a bevel pinion 16, intermeshing with bevel wheel 17, on shaft 18, carrying bevel pinion 19, intermeshing with bevel wheel 20, which is loosely mounted on the vertical shaft 21. This vertical shaft at its lower end has a pinion 22, intermeshing with a stationary annular rack 23, surrounding the base of foundation of the furnace. The shaft 21 is also provided with a loose pinion 24, between which and the wheel 20 is a double crab clutch device 25, by which either bevel wheel may be connected to the shaft, the other being disconnected therefrom at the same time. This clutch is operated by a rock shaft 26, having lever arm 27, arranged to engage and be actuated by stops 28 and 29, at the opposite ends of the path of movement. The bevel wheel 24 intermeshes with bevel wheel 30 on shaft 31, having pinion 32, engaging bevel wheel 33 on shaft 34, corresponding to the upper shaft 15.

An electric motor 35 has slow motion gearing connection with shaft 15, thereby driving the shaft 15 and the shaft 34 through the intermeshing of the similar gear wheels 32 and 33. The electric motor will oscillate the tank body, and at the same time rotate the gathering machine in a counter-clockwise direction, looking at Fig. 1, until the trip arm 27 strikes the trip 28. This will reverse the clutch, whereupon the apparatus will be reversed and the motor will turn the turret more rapidly in a counter-clockwise direction until the trip arm strikes the stop 29 at the other end of the travel. This will again reverse the movement and the turret will again slowly turn to the right, while the gathering machine operates within the hood, as it moves around the furnace.

The tank may have any suitable connection with a tank furnace, which will feed glass to the gathering tank, such a connection being shown at 36 in Fig. 3. The connection shown is of inverted siphon form, passing up underneath the support for the rotating body or turret, and thence into the bottom of the gathering tank. The furnace may be and preferably is heated by regenerative action, 37 being the entrance flue and 38 the exhaust flue for the heated products. Both of these flues are shown as leading into the upper stationary portion of the furnace, as this avoids complication and makes a simple and efficient structure. The furnace may, however, be heated in any other desirable manner. The dome-shaped top is supported independently of the turret portion and may be carried on brackets or hangers 39, depending from beams 40 extending across the top and between columns 41.

The advantages of our invention result from the turning of the turret from the tank and carrying a gathering device with this turret which operates with a recess giving it access to the glass in the tank. The turret may be rotated, oscillated, or given any turning movement desired, the movement may be continuous or intermittent, but is preferably continuous, in order to expose any one portion of the bath for only a short time. This portion of the bath will then be heated up again until the recessed portion of the turret again reaches it in the turret movement.

Any type of gathering device may be employed, and many other changes may be made without departing from our invention.

We claim:

1. A glass gathering tank, a furnace over the tank, means for turning at least a portion of the furnace to successively expose portions of the glass in the tank, and gathering machine movable with the turning portion of the furnace, substantially as described.

2. A glass gathering tank, a turret thereover, means for turning the turret, and a support carried by the turret and having a gathering device, substantially as described.

3. A glass gathering tank, a turning turret, a gathering machine movable with the turret, and connections arranged to oscillate the turret, substantially as described.

4. A glass gathering tank, a turret having a recess, a gathering machine movable with the turret, and operating through said recess, substantially as described.

5. A glass gathering tank, having a turning turret body portion and a stationary roof portion, and a gathering machine movable with the body or turret portion, substantially as described.

6. A glass gathering tank, a turning turret portion, a rotating gathering machine movable with the turret portion, and connections arranged to simultaneously turn the turret and rotate the gathering machine, substantially as described.

7. A glass gathering tank, a turning turret, a platform projecting from and carried by the turret, a gathering machine on the platform, and a driving motor on the platform arranged to turn the turret, substantially as described.

8. A glass gathering tank, a turning turret, a platform projecting from and carried by the turret, a gathering machine on the platform, and a driving motor on the platform arranged to turn the turret, and rotate the gathering machine, substantially as described.

9. A glass gathering tank, a turning turret, a platform projecting from and carried by the turret, a gathering machine on the platform, a driving motor on the platform arranged to turn the turret and rotate the gathering machine, and mechanism for automatically reversing the movement of oscillation, substantially as described.

In testimony whereof, we have hereunto set our hands.

HENRY L. DIXON.
ALEXANDER L. SCHRAM.

Witnesses as to Henry L. Dixon:
  G. M. VIERS,
  H. M. CORWIN.

Witnesses as to Alexander L. Schram:
  H. M. BECKWITH,
  J. R. HARKEY.